US012712239B2

(12) United States Patent
Wood et al.

(10) Patent No.: US 12,712,239 B2
(45) Date of Patent: Aug. 18, 2026

(54) DIMENSIONALLY-STABLE MICROPOROUS WEBS

(71) Applicant: Amtek Research International LLC, Lebanon, OR (US)

(72) Inventors: Weston J. Wood, Lebanon, OR (US); Richard W. Pekala, Corvallis, OR (US); Robert Waterhouse, Lebanon, OR (US); Scott D. Butler, Lebanon, OR (US)

(73) Assignee: Amtek Research International LLC, Lebanon, OR (US)

( * ) Notice: Subject to any disclaimer, the term of this patent is extended or adjusted under 35 U.S.C. 154(b) by 844 days.

(21) Appl. No.: 16/976,426

(22) PCT Filed: Mar. 4, 2019

(86) PCT No.: PCT/US2019/020625

§ 371 (c)(1),
(2) Date: Aug. 27, 2020

(87) PCT Pub. No.: WO2019/169410

PCT Pub. Date: Sep. 6, 2019

(65) Prior Publication Data

US 2021/0005862 A1 Jan. 7, 2021

Related U.S. Application Data

(60) Provisional application No. 62/637,866, filed on Mar. 2, 2018.

(51) Int. Cl.
*H01M 50/414* (2021.01)
*H01M 50/417* (2021.01)
(Continued)

(52) U.S. Cl.
CPC ....... *H01M 50/414* (2021.01); *H01M 50/417* (2021.01); *H01M 50/42* (2021.01);
(Continued)

(58) Field of Classification Search
CPC .. H01M 50/414; H01M 50/417; H01M 50/42; H01M 50/426; H01M 50/434; H01M 50/451; H01M 50/457; H01M 50/491
See application file for complete search history.

(56) References Cited

U.S. PATENT DOCUMENTS 6,753,114 B2 6/2004 Jacobs et al.
7,638,230 B2 12/2009 Fujita et al.
(Continued)

FOREIGN PATENT DOCUMENTS

CN 106252565 A 12/2016
WO 2014030507 A1 2/2014
(Continued)

OTHER PUBLICATIONS

CN-106252565-A English machine translation (Year: 2023).*
(Continued)

*Primary Examiner* — Armindo Carvalho, Jr.
(74) *Attorney, Agent, or Firm* — Dorsey & Whitney LLP

(57) ABSTRACT

Multi-layer structures are disclosed herein containing a microporous polymer web having two major surfaces and an inorganic material including nano- and micro-particles formed as a first porous layer on one or both of the major surfaces of the microporous polymer web. The first porous layer provides high-temperature dimensional stability and preserved multi-layer structure above the melting point of the microporous polymer web even as fluid permeability of the unitary multi-layer structure is decreased at elevated
(Continued)

temperature. The first porous layer has improved peel strength as compared to an equivalent layer devoid of nanoparticles.

16 Claims, 7 Drawing Sheets

(51) Int. Cl.
*H01M 50/42* (2021.01)
*H01M 50/426* (2021.01)
*H01M 50/434* (2021.01)
*H01M 50/451* (2021.01)
*H01M 50/457* (2021.01)
*H01M 50/491* (2021.01)

(52) U.S. Cl.
CPC ....... *H01M 50/426* (2021.01); *H01M 50/434* (2021.01); *H01M 50/451* (2021.01); *H01M 50/457* (2021.01); *H01M 50/491* (2021.01)

(56) References Cited

U.S. PATENT DOCUMENTS

2008/0292968 A1 11/2008 Lee et al.
2009/0111025 A1 4/2009 Lee et al.
2010/0112432 A1* 5/2010 Nishida .............. H01M 50/449 429/144
2012/0028104 A1 2/2012 Brant et al.
2012/0145468 A1 6/2012 Pekala et al.
2012/0164513 A1 6/2012 Peng et al.
2014/0162110 A1* 6/2014 Chen .................... H01M 50/42 429/247
2015/0162588 A1* 6/2015 Lee .................... H01M 50/494 156/50
2018/0043656 A1* 2/2018 Song .................. H01M 50/491
2020/0243824 A1* 7/2020 Wang ................. H01M 10/049

FOREIGN PATENT DOCUMENTS

WO 2014136838 A1 9/2014
WO 2017160892 A1 9/2017
WO 2019169410 A1 9/2019

OTHER PUBLICATIONS

European Patent Office, Extended European Search Report for Application 19760170.1, mailed Dec. 14, 2021, 14 pages.
Mao et al.: "Polyethylene separator activated by hybrid coating improving Li+ ion transference number and ionic conductivity for Li-metal battery", Journal of Power Sources, vol. 342, Jan. 7, 2017, 9 pages.
Yang et al.: "Boehmite particle coating modified microporous polyethylene membrane: A promising separator for lithium ion batteries", Journal of Power Sources, vol. 348, Mar. 3, 2017, 7 pages.
PCT/US2019/020625, et al., International Search Report and Written Opinion, Jul. 1, 2019, 10 pages.
C. Yang et al, "Boehmite particle coating modified microporous polyethylene membrane: A promising separator for lithium ion batteries", Journal of Power Sources 348 (2017) 80-86.

* cited by examiner

Coat wt. for high temp. dimensional stability (g/m2)

MD Shrinkage below 10%

MD Shrinkage above 10%

Nanoparticle loading level (wt%)

Peel Strength (N)
1.40
1.20
1.00
0.80
0.60
0.40
0.20
0.00
Binder A
Binder B
0
20
40
60
80
100
120
Nanoparticle loading level (wt%)

DIMENSIONALLY-STABLE MICROPOROUS WEBS

RELATED APPLICATIONS

This application is a National Stage of International Application No. PCT/US2019/020625, filed Mar. 4, 2019, entitled DIMENSIONALLY-STABLE MICROPOROUS WEBS, which claims priority benefit of U.S. Provisional Patent Application No. 62/637,866, filed Mar. 2, 2018, entitled DIMENSIONALLY-STABLE MICROPOROUS WEBS, the contents of both of which are hereby incorporated by reference in their entireties.

COPYRIGHT NOTICE

© 2019 Amtek Research International LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The present disclosure relates to the formation of freestanding microporous polymer webs that (1) exhibit good in-plane dimensional stability (i.e., low shrinkage) and preserved multi-layer structure at temperatures both above and below the melting point of the base polymer membrane, (2) maintain shutdown properties, and (3) have good adhesion between (i) porous layers containing inorganic materials and (ii) the base polymer membrane. At high temperatures, the pores within the bulk structure of the base polymer membrane can begin to collapse or shut down and thereby modify its permeability. Such webs can be used as separators to improve the manufacturability, performance, and safety of energy storage devices such as lithium-ion batteries.

BACKGROUND INFORMATION

Separators are an integral part of the performance, safety, and cost of lithium-ion batteries. During normal operation, the principal functions of the separator are to prevent electronic conduction (i.e., short circuit or direct contact) between the anode and cathode while permitting ionic conduction by means of the electrolyte. For small commercial cells under abuse conditions, such as external short circuit or overcharge, the separator is required to shutdown at temperatures well below those at which thermal runaway can occur. This requirement is described in Doughty. D, *Proceedings of the Advanced Automotive Battery Conference*, Honolulu, HI (June 2005). Shutdown results from the collapse of pores in the separator caused by melting and viscous flow of the polymer, thus slowing down or stopping ion flow between the electrodes. Nearly all lithium-ion battery separators contain polyethylene as part of a single- or multi-layer construction so that shutdown often begins at about 130° C., the melting point of polyethylene.

Separators for the lithium-ion market are presently manufactured through the use of "dry" or "wet" processes. Celgard LLC and others have described a dry process, in which polypropylene (PP) or polyethylene (PE) is extruded into a thin sheet and subjected to rapid drawdown. The sheet is then annealed at 10-25° C. below the polymer melting point such that crystallite size and orientation are controlled. Next, the sheet is rapidly stretched in the machine direction (MD) to achieve slit-like pores or voids. Trilayer PP/PE/PP separators produced by the dry process are commonly used in lithium-ion rechargeable batteries.

Wet process separators composed of polyethylene are produced by extrusion of a plasticizer/polymer mixture at elevated temperature, followed by phase separation, biaxial stretching, and extraction of the pore former (i.e., plasticizer). The resultant separators have elliptical or spherical pores with good mechanical properties in both the machine and transverse directions. PE-based separators manufactured this way by Toray Tonen Specialty Separator, Asahi Kasei Corp., SK Innovation Co., Ltd., and Entek® Membranes LLC have found wide use in lithium-ion batteries.

More recently, battery failures arising in commercial operation have demonstrated that shutdown is not a guarantee of safety. The principal reason is that, after shutting down, residual stress and reduced mechanical properties above the polymer melting point can lead to shrinkage, tearing, or pinhole formation. The exposed electrodes can then touch one another and create an internal short circuit that leads to more heating, thermal runaway, and explosion.

In the case of large format lithium-ion cells designed for hybrid or plug-in hybrid applications (HEV, PHEV), the benefits of separator shutdown have been openly questioned because it is difficult to guarantee a sufficient rate and uniformity of shutdown throughout the complete cell. This issue is described in Roth, E. P., *Proceedings of Lithium Mobile Power Conference*, San Diego, CA (October 2007). Many companies are focused, therefore, on modifying the construction of a lithium-ion battery to include (1) a heat-resistant separator or (2) a heat-resistant layer coated on either the electrodes or a conventional polyolefin separator. Heat-resistant separators composed of high temperature polymers (e.g., polyimides, polyester, and polyphenylene sulfide) have been produced on a limited basis from solution casting, electrospinning, or other process technologies. In these cases, the high polymer melting point prevents shutdown at temperatures below 200° C.

U.S. Patent Application Pub. No. US 2012/0145468 describes a freestanding, microporous, ultrahigh molecular weight polyethylene (UHMWPE)-based separator that contains sufficient inorganic filler particles to provide low shrinkage while maintaining high porosity at temperatures above the melting point of the polymer matrix (>135° C.). Such freestanding, heat resistant separators have excellent wettability and ultralow impedance, but they do not exhibit shutdown properties because of the high loading level of the inorganic filler.

U.S. Pat. No. 7,638,230 B2 describes a porous heat resistant layer coated onto the negative electrode of a lithium-ion secondary battery. The heat resistant layer is composed of an inorganic filler and a polymer binder. Inorganic fillers include magnesia, titania, zirconia, or silica. Polymer binders include polyvinylidene fluoride and a modified rubber mixture containing acrylonitrile units. Higher binder contents negatively impact the high rate discharge characteristics of the battery.

U.S. Patent Application Pub. Nos. US 2008/0292968 A1 and US 2009/0111025 A1 each describe an organic/inorganic separator in which a porous substrate is coated with a mixture of inorganic particles and a polymer binder to form an active layer on at least one surface of the porous substrate. The porous substrate can be a non-woven fabric, a membrane, or a polyolefin-based separator. Inorganic particles are selected from a group including those that exhibit one or more of dielectric constant greater than 5, piezoelectricity, and lithium ion conductivity. Selected polymer binders are described. The composite separator is said to exhibit excellent thermal safety, dimensional stability, electrochemical safety, and lithium ion conductivity, compared to uncoated polyolefin-based separators used in lithium-ion batteries. In the case of certain polymer binders mixed with the inorganic particles, a high degree of swelling with an electrolyte can result in the surface layer, but rapid wetting or swelling is not achieved in the polyolefin substrate.

In the latter two of the above approaches, there is an inorganic-filled layer that is applied in a secondary coating operation onto the surface of an electrode or porous substrate to provide heat resistance and prevent internal short circuits in a battery.

SUMMARY OF THE DISCLOSURE

Several embodiments of the freestanding microporous polymer webs rely upon ultrahigh molecular weight polyethylene (UHMWPE) as a polyolefin base membrane component. The repeat unit of polyethylene is $(—CH_2CH_2—)_x$, where x represents the average number of repeat units in an individual polymer chain. In the case of polyethylene used in many film and molded part applications, x equals about 10,000; whereas for UHMWPE, x is approximately 150,000. This extreme difference in the number of repeat units is responsible for a higher degree of chain entanglement and the distinctive properties associated with UHMWPE.

One such property is the ability of UHMWPE to resist material flow under its own weight when heated above its melting point. This phenomenon is a result of its ultrahigh molecular weight and the associated long relaxation times, even at elevated temperatures. Although UHMWPE is commonly available, it is difficult to process into fiber, sheet, or membrane form. The high melt viscosity requires a compatible plasticizer and a twin screw extruder for disentanglement of the polymer chains such that the resultant gel can be processed into a useful form. This approach is commonly referred to as "gel processing." In many cases, other polyolefins are blended with UHMWPE to lower the molecular weight distribution to impact properties after extraction of the plasticizer, which extraction results in a porous membrane.

For most of the preferred embodiments described, the microporous polyolefin membrane is manufactured by combining UHMWPE, high density polyethylene (HDPE), and a plasticizer (e.g., mineral oil). A mixture of UHMWPE and HDPE is blended with the plasticizer in sufficient quantity and extruded to form a homogeneous, cohesive mass. The mass is processed using blown film, cast film, or calendering methods to give an oil-filled sheet of a reasonable thickness (<250 μm). The oil-filled sheet can be further biaxially oriented to reduce its thickness and affect its mechanical properties. In an extraction operation, the oil is removed with a solvent that is subsequently evaporated to produce a microporous polyolefin membrane that is subsequently coated with an inorganic surface layer.

"Freestanding" refers to a web having sufficient mechanical properties that permit manipulation such as winding and unwinding in film form for use in an energy storage device assembly.

In a first preferred embodiment, the polyolefin base membrane is passed through an aqueous-based dispersion, such as an alcohol/water dispersion of a inorganic material. The inorganic material can include an inorganic oxide, carbonate, or hydroxide, such as, for example, alumina, silica, zirconia, titania, mica, boehmite, magnesium hydroxide, calcium carbonate, and mixtures thereof. A surface coating of controlled thickness can be formed with wire-wound rods (e.g., Mayer rods) as the membrane is pulled through the aqueous-based dispersion. The wetted membrane is subsequently dried with a series of air knives and an oven in which hot air is used to evaporate the liquid phase, thereby forming a first porous layer on one or both of the major surfaces of the microporous polymer web.

The first porous layer includes sufficient inorganic material nanoparticles to provide good adhesion to the microporous polymer web. For example, the inorganic material of the first porous layer may include about 10% to about 60% by weight nanoparticles or about 20% to about 50% by weight nanoparticles. The remainder of the inorganic material of the first porous layer is micro-particles, such as boehmite particles or other alumina micro-particles. Microparticles with platelet-like structures, such as boehmite, can be beneficial in improving adhesion. Preferably, which the first porous layer has at least a 20% improvement in average peel strength as compared to an equivalently-composed layer devoid of nanoparticles. Preferably, the first porous layer contains sufficient nanoparticles to impart an average peel strength of at least 31 N/m to the first porous layer, such as an average peel strength from 31 N/m to 200 N/m, from 31 N/m to 100 N/m, from 37 N/m to 94 N/m, from 42 N/m to 89 N/m, or from 47 n/m to 84 n/m.

At high temperatures, the pores within the bulk structure of the base polyolefin membrane can begin to collapse or shut down, thereby modifying its permeability and reducing ionic conduction. This in turn shuts down the battery cell. In the first preferred embodiment, the inorganic material surface coating has at least a threshold coating ratio of the inorganic material to polyolefin on a weight basis sufficient to maintain in-plane dimensional stability (in the plane defined by the machine direction and the transverse direction) and preserved multi-layer structure above the melting point of the polyolefin membrane (such as about 45° C. above the melting point of the polyolefin membrane). This prevents contact between the electrodes while the battery cell is shutting down due to loss of ionic conduction.

"Unitary, multi-layer structure" refers to a microporous polymer web with a porous layer containing inorganic material formed on at least one of the major surfaces of the web. Both major surfaces of the web may have the porous layer formed thereon. The porous layer containing inorganic material may have additional layers formed thereon, such as a second porous layer composed of a gel-forming polymer material. The multiple layers form a unitary structure.

In the preferred embodiments, the multi-layer structure, as well as dimensional stability, is preserved during shutdown (i.e., as fluid permeability of the unitary multi-layer structure is decreased above the melting point of the microporous polymer web). In other words, micro-buckling is avoided and layer interfacial boundaries are preserved. FIG. 9A depicts an SEM image of an inorganic coated PE-based separator exposed to 180° C. temperatures with high shrinkage (>20% shrinkage). As can be seen in FIG. 9A, inorganic material with insufficient adhesion separated from the PE as the separator shrank. In contrast, as depicted in FIG. 9B, the SEM image of an inorganic coated PE-based separator exposed to 180° C. temperatures with low shrinkage maintained the multi-layer structure and the inorganic material maintained adhesion to the PE during shutdown. Additionally, interfacial boundaries are maintained. When the multi-layer structure is preserved during shutdown, a clear distinction from the layer containing inorganic materials and the polymer layer can be seen under SEM.

Preferably, dimensional stability is sufficient maintained during shutdown to avoid shrinkage of more than 10% in either the machine direction or transverse direction.

In the preferred embodiment, an organic hydrogen bonding component may be present, such about 5% or less, in the aqueous-based dispersion. Preferred organic hydrogen bonding components include both polymers and small molecules with multiple hydrogen bonding sites. Preferred polymers include polyvinylpyrrolidone (PVP), carboxymethyl cellulose (CMC), polyacrylics, polyethylene oxide, polyvinyl alcohol, and mixtures thereof. Preferred small molecules include catechol, sucrose, tannic acid, maltitol, dimethylol dihydroxyethylene urea (DMDHEU), and pentaerythritol.

Preferably, the first porous layer contains sufficient nanoparticles to impart an average peel strength of at least 31 N/m to the first porous layer, such as an average peel strength from 31 N/m to 200 N/m, with about 10% or less, by weight, of an organic hydrogen bonding component, such as about 1% to about 10%, about 1% to about 8%, or 1% to about 6% of an organic hydrogen bonding component. For example, by incorporating sufficient nano-particles, the preferred average peel strength may be achieved with about 10% or less of an organic hydrogen bonding component composed of PVP-based polymer, a mixture of polymers containing primarily polyacrylics, or mixtures thereof.

Preferably, the first porous layer has a median pore size of about 15 nm to about 100 nm. It is possible to tailor the porosity of the porous layer containing inorganic materials by controlling the ratio of micro-particles to nano-particles. With a low ratio of micro-particles to nano-particles in the porous layer, then a small median pore size results. With a high ratio of micro-particles to nano-particles in the porous layer, then a large median pore size results. For example, a ratio of about 2:1 can achieve a median pore size of about 12-40 nm. In another example, a ratio of about 4:1 can achieve a median pore size of about 40-60 nm. In yet another example, a ratio of about 8:1 can achieve a median pore size of about 80-100 nm.

Additionally, the inorganic material preferably has a sufficient ratio of nano-particles to micro-particles at a threshold coating ratio that minimizes the thickness of the first porous layer.

Furthermore, the first porous layer can be further coated with a second porous layer that includes a gel-forming polymer material to increase laminability of the separator to electrodes.

Finally, for each of the above embodiments, corona treatment of the polyolefin-based membrane can improve the overall average peel strength of the coated separator. Applicant believes that oxygen-containing species (e.g., hydroxyl groups) resulting from the corona treatment of the polyolefin membrane surface hydrogen bond with the inorganic particles to improve the adhesive strength at the interface between the inorganic surface layer and the polyolefin membrane.

The resultant microporous, freestanding polyolefin separator as described for preferred embodiment can be wound or stacked in a package to separate the electrodes in an energy storage device, for example, a battery, capacitor, supercapacitor, or fuel cell. Electrolyte can be added to gel the gel-forming polymer material and to fill the pores both in the inorganic material and throughout the bulk structure of the base polymer membrane. Such separators are beneficial to the manufacture of energy storage devices, particularly since they combine good heat resistance, in-plane dimensional stability, intralayer adhesion, are laminable, and shutdown characteristics.

Thus, with the benefit of this disclosure, one of skill in the art can tailor a ratio of micro-particles to nano-particles in the porous layer to achieve: (1) sufficient adhesion to a microporous polymer web to achieve high-temperature dimensional stability and preserved multi-layer structure above the melting point of the microporous polymer web; (2) minimize the moisture-content of the porous layer; and (3) sufficient porosity of the porous layer containing inorganic material.

Additional aspects and advantages will be apparent from the following detailed description of preferred embodiments, which proceeds with reference to the accompanying drawings.

DETAILED DESCRIPTION OF PREFERRED EMBODIMENTS

Figures 1, 2:
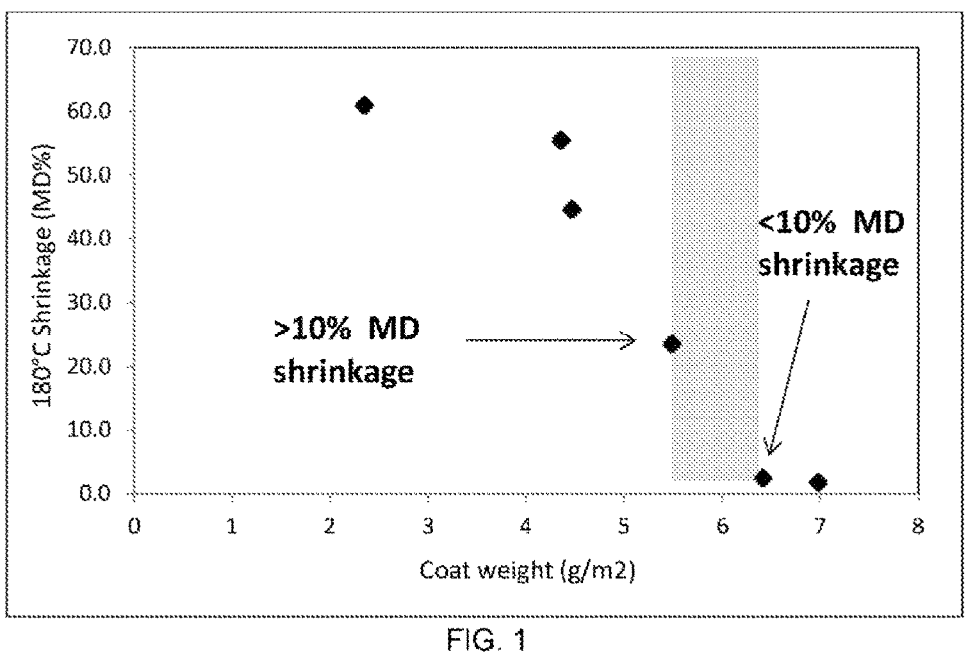
FIG. 1 depicts inorganic material coat weights from Example 1 corresponding to 180° C. shrinkage above 10% machine direction (MD) and below 10% MD plotted as a function of nanoparticle concentration.
FIG. 2 depicts the results form Example 1 of thermal shrinkage as a function of nanoparticle concentration for a polyolefin separator coated with inorganic particles utilizing Binder A.

The base membrane utilizes a polyolefin matrix. The polyolefin most preferably used is an ultrahigh molecular weight polyethylene (UHMWPE) having an intrinsic viscosity of at least 10 deciliter/gram, and preferably in the range from 18-22 deciliters/gram. It is desirable to blend the UHMWPE with other polyolefins such as HDPE or linear low density polyethylene (LLDPE) to impact the shutdown properties of the membrane. Membranes can also be manufactured from other polyolefins or their blends, such as, for example, ethylene-propylene copolymers, polypropylene, and polymethyl pentene.

The plasticizer employed is a nonevaporative solvent for the polymer and is preferably a liquid at room temperature. The plasticizer has little or no solvating effect on the polymer at room temperature; it performs its solvating action at temperatures at or above the softening temperature of the polymer. For UHMWPE, the solvating temperature would be above about 160° C., and preferably in the range of between about 180° C. and about 240° C. It is preferred to use a processing oil, such as a paraffinic oil, naphthenic oil, aromatic oil, or a mixture of two or more such oils. Examples of suitable processing oils include: oils sold by Shell Oil Company, such as Gravex™ 942; oils sold by Calumet Lubricants, such as Hydrocal™ 800; and oils sold by Nynas Inc., such as HR Tufflo® 750.

The polymer/oil mixture is extruded through a sheet die or annular die, and then it is biaxially oriented to form a thin, oil-filled sheet. Any solvent that is compatible with the oil can be used for the extraction step, provided it has a boiling point that makes it practical to separate the solvent from the plasticizer by distillation. Such solvents include 1,1,2 trichloroethylene; perchloroethylene; 1,2-dichloroethane; 1,1,1-trichloroethane; 1,1,2-trichloroethane; methylene chloride; chloroform; 1,1,2-trichloro-1,2,2-trifluoroethane; isopropyl alcohol; diethyl ether; acetone; hexane; heptane; and toluene. In some cases, it is desirable to select the processing oil such that any residual oil in the polyolefin membrane after extraction is electrochemically inactive.

The coating formulations used in the first aqueous-based dispersion of both preferred embodiments is composed of inorganic particles in which greater than 50% water is counted in the liquid phase. The inorganic particles are typically charge stabilized and stay suspended in the alcohol/water mixture. An organic hydrogen bonding component, such as low molecular weight, water-soluble polymer, is also present. It is desirable to choose a polymer with numerous hydrogen bonding sites to minimize its concentration, yet achieve a robust, microporous inorganic surface layer that does not easily shed inorganic particles.

In addition to controlling the amount of organic hydrogen bonding component and inorganic particles in the coating formulation, applicants believe it is important to control the particle size distribution of the inorganic particles. Furthermore, the coating formulation was carefully applied to the polyolefin base membrane to control the thickness of the resultant inorganic surface layer.

Small amounts of nanoparticles can substantially reduce coat weight required to reach high temperature dimensional stability (180° C.). However, the higher surface area particles retain more moisture than the low surface area particles (i.e., larger size particles). One approach to address the moisture retention is to use a blend of high and low surface area particles. Low surface area particles ("micro-particles") do not tend to retain as much moisture as the high surface area particles ("nano-particles").

Additionally, the ratio of nanoparticles to micro-particles can be optimized to maximize adhesion of the coated layer (i.e., first porous layer) to the base membrane. It is believed that inorganic materials containing a combination of 20% to 50% nanoparticles, by weight, and the balance micro-particles provides optimal adhesion of the first porous layer to the base membrane. In some instances, the nanoparticle fraction of the total inorganic material content may be as low as 10% or as high as 60% and still have optimal adhesion. Without wishing to be bound by theory, 20% to 50% by weight of nanoparticles and the balance of the inorganic material content being micro-particles may have optimal adhesion due to the mixed particle system impeding fracture propagation, see, for example, FIG. 6.

As used herein, "nano-particles" refers to individual particles or multi-particle aggregates with a mean size less than or equal to about 100 nanometers. The term "micro-particles" refers to individual particles, multi-particle aggregates, or multi-aggregate agglomerates with a mean size larger than 100 nanometers to about 2 microns. As used herein, the nanoparticles are not small enough to penetrate into the bulk structure of the polyolefin membrane. Similarly, "nanoporous" indicates pores are present with a mean size of about 100 nm or less, and "microporous" indicates pores are present with a mean size of greater than about 100 nm to about 1 micron.

As the percentage of nanoparticles increases, then the thickness of the first porous layer can be decreased while maintaining dimensional stability. Or stated another way, the threshold coating ratio of inorganic particles to base membrane (i.e., minimum ratio to maintain dimensional stability) decreases as the percentage of nanoparticles increases. It should be understood that the threshold coating ratio and threshold coating thickness (i.e., minimum coating thickness to maintain dimensional stability for a given base membrane thickness) refer to similar concepts. It should be understood that the threshold coating thickness can be achieved by coating one side of the membrane with the total thickness or by coating two sides of the membrane with half of the threshold thickness.

It is possible to select an inorganic material to base membrane ratio and a nanoparticle concentration that achieves a desired dimensional stability with acceptable levels of moisture, while optimizing adhesion of the inorganic material to the base membrane.

As the weight of the base web increases (due to increasing thickness or reduced porosity), then the weight of the inorganic particles required increases (and the corresponding thickness), so to achieve the selected threshold coating ratio. The higher surface area nanoparticles require less weight (and less corresponding thickness) to achieve the same dimensional stability as lower surface area inorganic micro-particles. It is believed that the threshold coating ratio of inorganic particles is governed by the surface area and weight of the inorganic particles relative to the weight of the microporous polymer web. Therefore, the inorganic particle coated microporous polymer webs could also be further coated, such as in a second aqueous-based dispersion with gel-forming polymer material, and retain dimensional stability.

Example 1

The effect of nanoparticle concentration on critical coat weight required to achieve high temperature dimensional stability was evaluated. Shrinkage testing was performed at 180° C. for 30 minutes. 12 μm thick, microporous ultrahigh molecular weight polyethylene-containing separators, Entek® EPH (Entek Membranes LLC, Oregon) were coated with different aqueous-based dispersions. Two different binder systems at 6 wt % were evaluated: "Binder A" and "Binder B." Binder A was a PVP-based polymer. Binder B was a mixture of polymers containing primarily polyacrylics. Different aqueous-based dispersions were tested that included mixed grades of nano-particulate alumina (PG003, Cabot, aqueous dispersion with a primary particle size of about 20 nm) and micro-particulate boehmite (mean particle size of about 1.4 microns), with the nanoparticle concentration ranging from 0 wt % to 100 wt % of total inorganic material content. The boehmite micro-particles have a platelet-like structure (see FIG. 6).

Ceramic coat weights corresponding to 180° C. shrinkage above 10% machine direction (MD) and below 10% MD were plotted as a function of nanoparticle concentration (see FIG. 1).

Figures 3, 4:
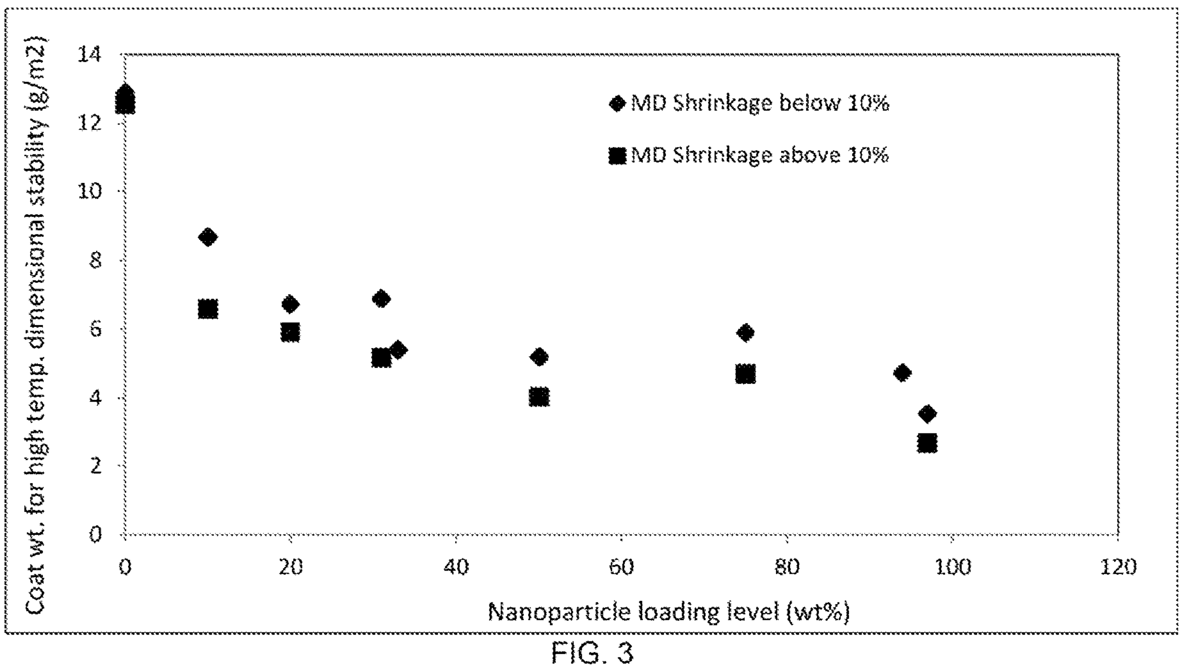
FIG. 3 depicts the results form Example 1 of thermal shrinkage as a function of nanoparticle concentration for a polyolefin separator coated with inorganic particles utilizing Binder B.
FIG. 4 depicts adhesive strength as a function of nanoparticle concentration for the coated separators of Example 1.

Thermal shrinkage as a function of nanoparticle concentration for a polyolefin separator coated with inorganic particles utilizing Binder A is depicted in FIG. 2. Thermal shrinkage as a function of nanoparticle concentration for a polyolefin separator coated with inorganic particles utilizing Binder B is depicted in FIG. 3.

Example 2

Peel tests were conducted to test adhesion of the inorganic coatings to the polyolefin base membranes. An average peel strength test was performed, in which each coated separator was placed horizontally on a steel plate and magnetic strips were placed on the edges of the separator to secure the separator. A pressure sensitive tape (3M Scotch® Magic™ Tape 810, ¾ inch (1.9 cm) width), was applied to the coated separator. The free end of the tape was secured to a fixture clip, and the tape was peeled at 180° from the original tape orientation (i.e., 180° peel test configuration) at a speed of 8.5 mm/second and a distance of 100 mm. A force gauge (Chatillon, DFGS-R-10) with a 10±0.005 lbs. (4 kg±2.7 g) load cell capacity was used to measure the force required to remove the coating layer from the base polyolefin membrane, and the average load was recorded. All testing was performed at room temperature. FIG. 4 depicts adhesive strength as a function of nanoparticle concentration for the coated separators. The data can be converted to N/m by dividing the values by 0.019 m, the width of the pressure sensitive tape. Optimal adhesive strength occurred when the nanoparticle concentration ranged from about 20 wt % to about 50 wt %.

Example 3

Figure 5:
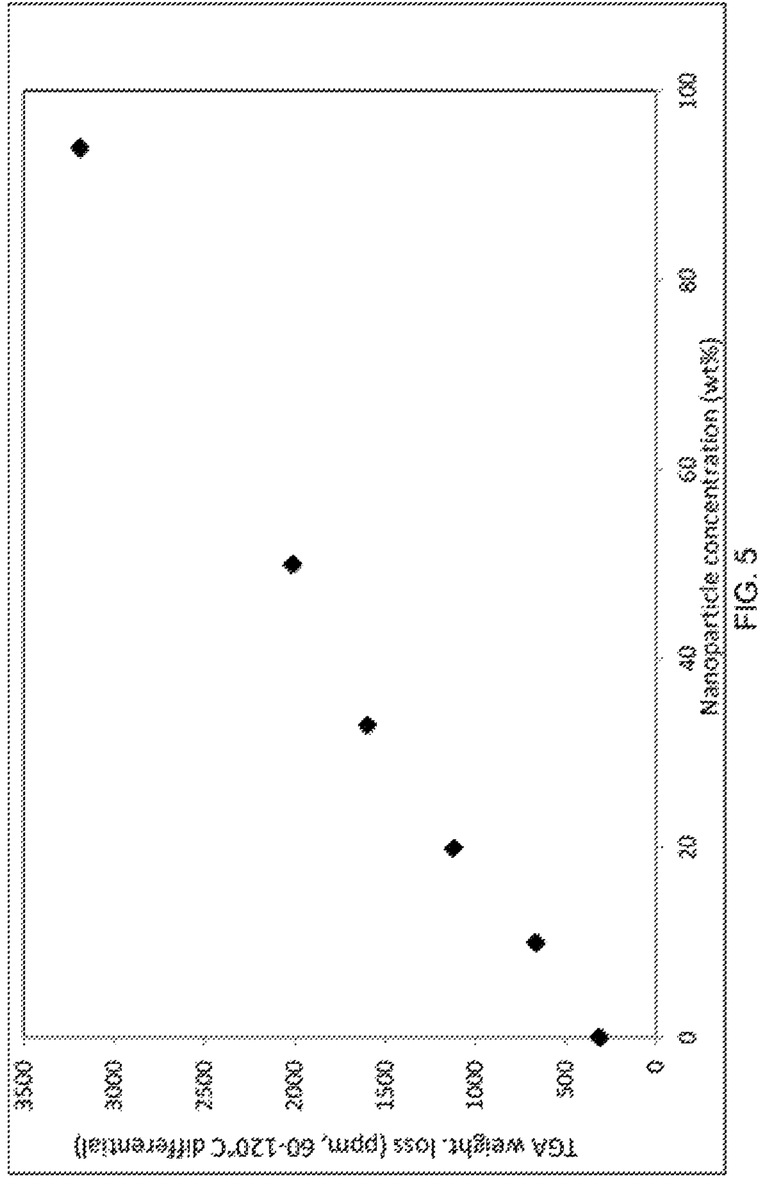
FIG. 5 depicts thermogravimetric analysis weight loss (corresponds to moisture content) as a function of nanoparticle concentration for the coated separators of Example 1.

Thermogravimetric analysis (TGA) was conducted for the coated separators of Example 1. FIG. 5 depicts TGA weight loss (corresponds to moisture content) as a function of nanoparticle concentration for the coated separators. Increasing nanoparticle loading level increased the moisture content in the separator. Table 1 lists the data plotted in FIG. 5 and the coat weight of the coating layer.

TABLE 1

| Nano-particle concentration (%) | Porous layer coat weight (g/m$^2$) | TGA weight loss (ppm, 60-120° C. differential) |
|---|---|---|
| 0 | 10.9 | 311 |
| 10 | 8.67 | 664 |
| 20 | 6.7 | 1120 |
| 33 | 5.39 | 1597 |
| 50 | 5.19 | 2010 |
| 94 | 4.72 | 3188 |

Example 4

A coated separator of Example 1 with 33% nanoparticles was further coated with an aqueous based-dispersion that contained the following:

233 g XPH 884 (25 wt. % PVDF-HFP; Solvay)
216 g Distilled water
30 g Isopropanol (ACS Grade)
21 g Selvol 09-325 polyvinyl alcohol aqueous solution (8.5 wt % solids; 98% hydrolyzed; Sekisui)

Figure 6:
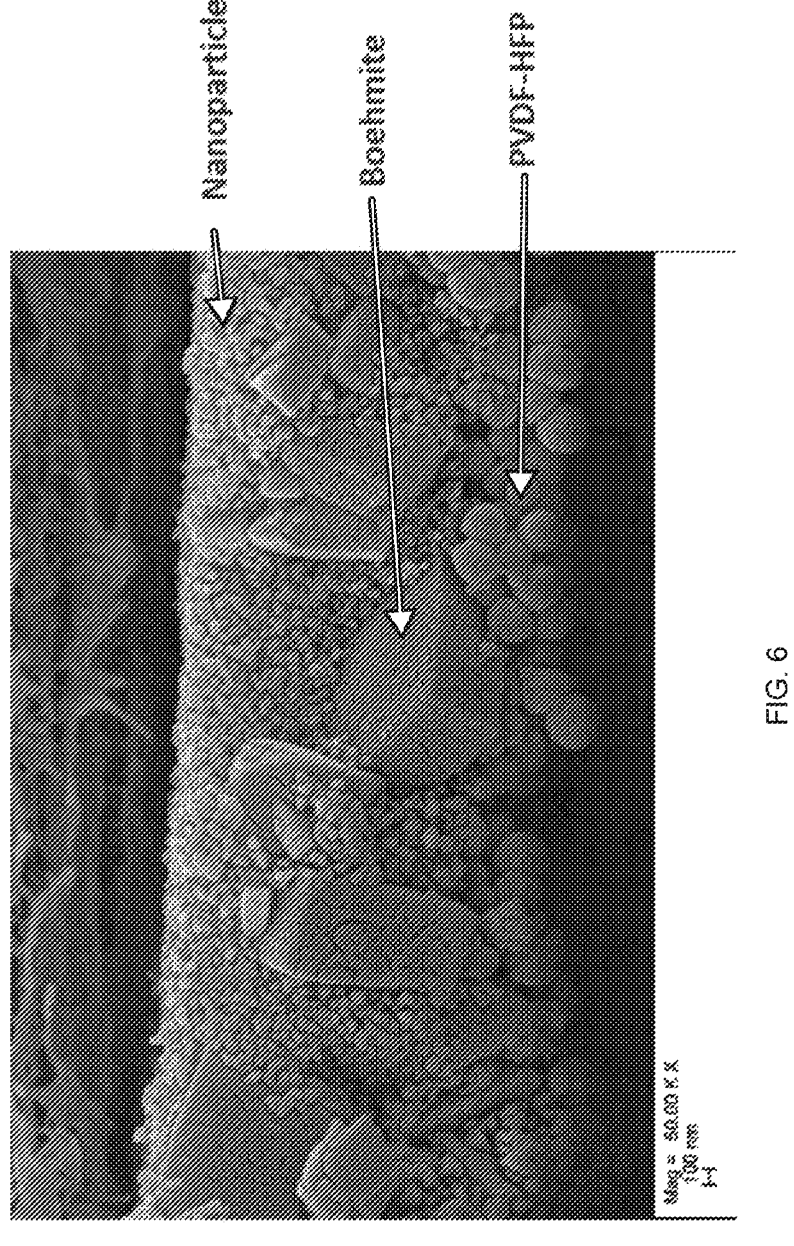
FIG. 6 depicts an SEM image for a coated separator from Example 1 with about 33% nanoparticles by weight and further coated with a PVDF-HFP coating.

The coating dispersion contained 12 wt. % solids with a 97/3 PVDF-HFP/PVOH mass ratio. The separator was dip-coated through a bath containing the aqueous-based dispersion, and the thickness of the wet layer was controlled on each side with a #4 Mayer rod. The wetted separator was then dried with a series of air knives and transported through a vertical oven set at 80° C. and wound on a core, prior to testing. FIG. 6 depicts an SEM image for a coated separator from Example 1 with about 33% nanoparticles by weight and further coated with the PVDF-HFP coating.

Example 5

Figure 7:
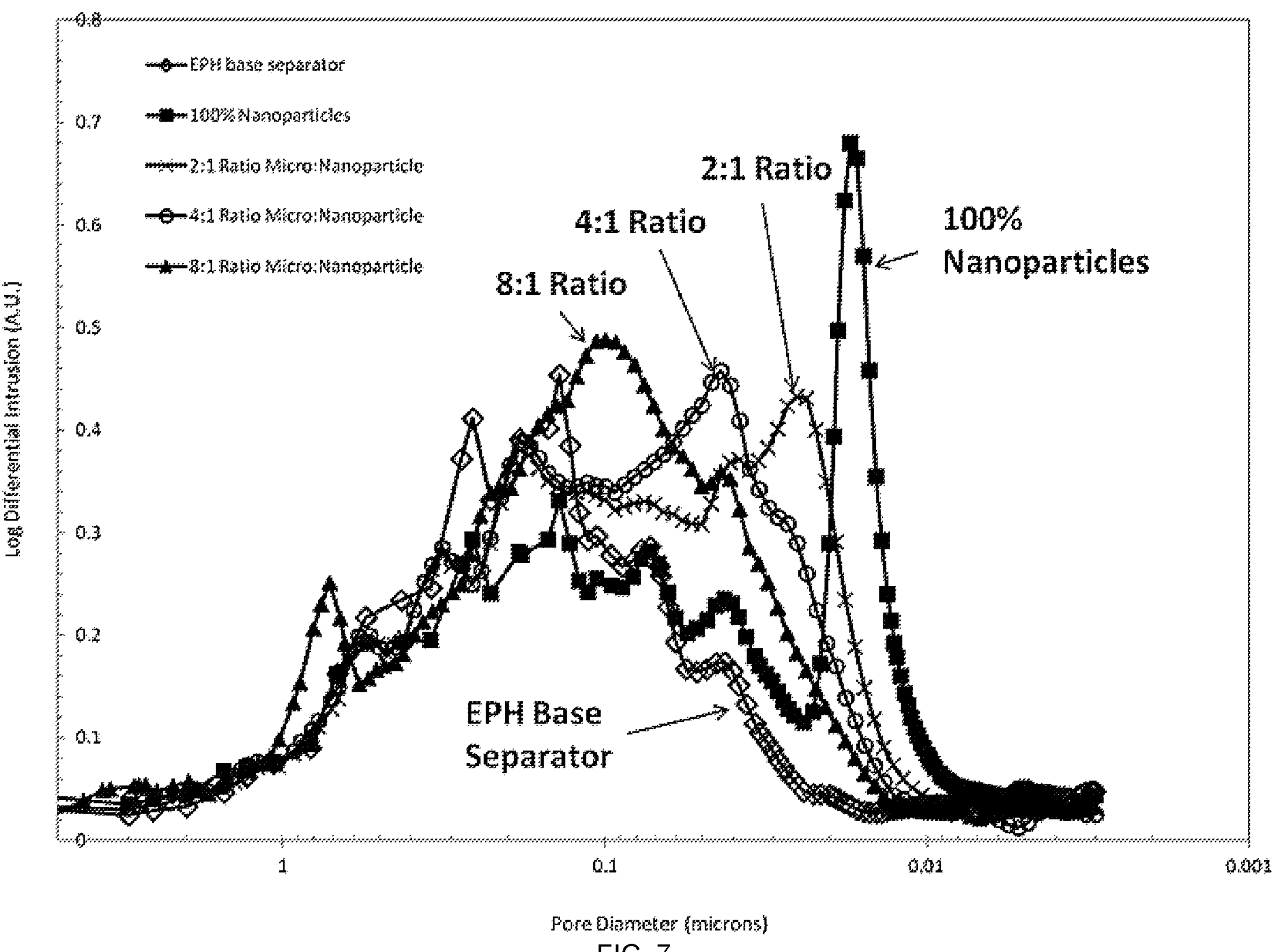
FIG. 7 depicts experiments showing the effect of micro-: nano-particle ratios on inorganic coating on pore size distribution in a porous layer containing inorganic materials.

Mercury porosimetry differential intrusion of various inorganic coated separators was conducted. The experiments show the effect of micro-:nano-particle ratios on pore size distribution of the coating. All inorganic coatings were applied to ENTEK EPH base separator. The micro-particles were composed of CEH-1 (Saint Gobain, mean particle size of 0.5 micron). Nano-particles were composed of PG008 (Cabot, ~20 nm primary particle size). The inorganic porous layer median pore size ranged from ~15 nm (100% nanoparticles for the inorganic portion) to ~100 nm (8:1 ratio micro-particle:nano-particle). The pore size distributions for the base separator and the different ratios tested are depicted in FIG. 7.

Example 6

Figure 8:
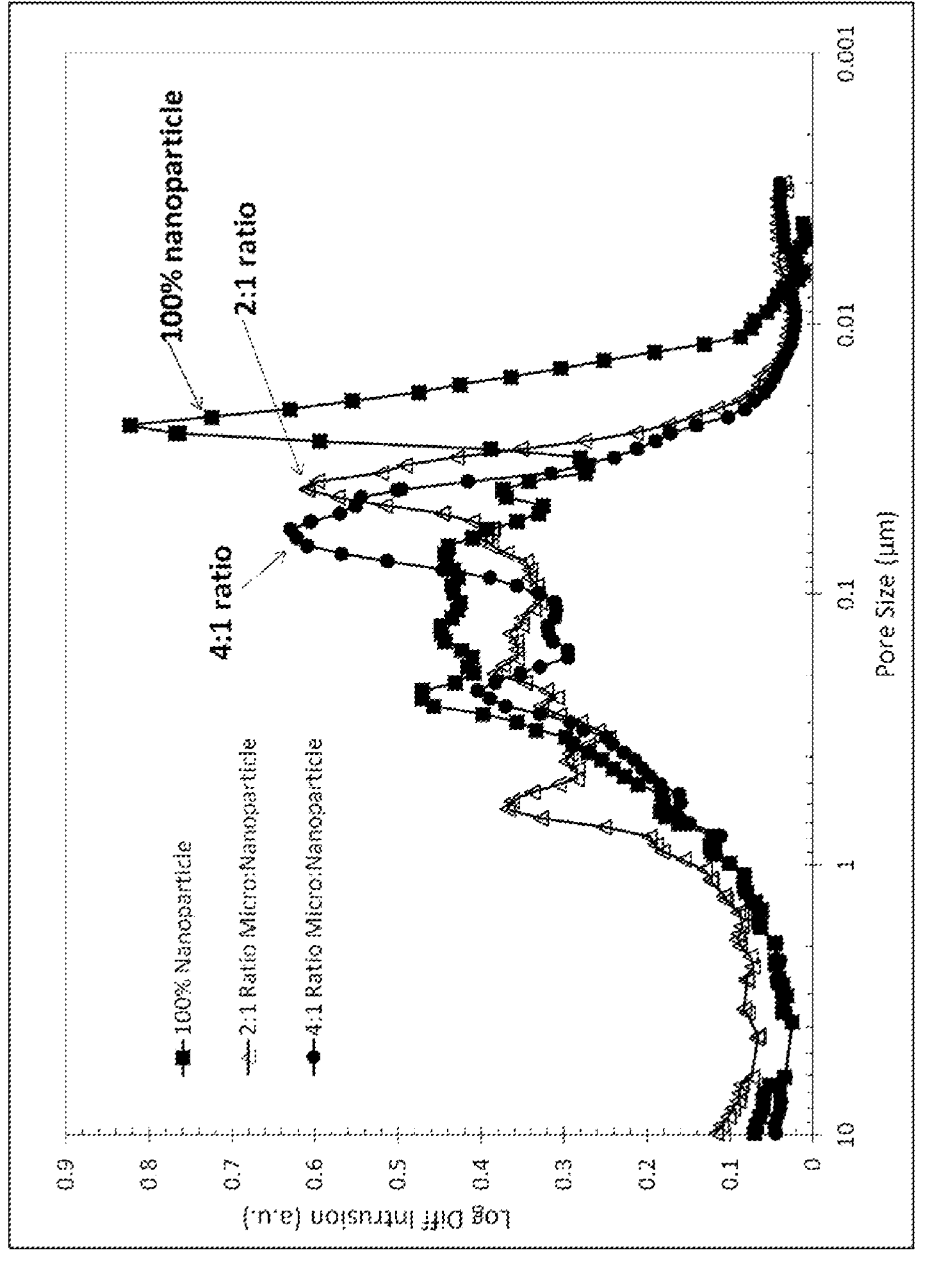
FIG. 8 depicts pore size distribution for the micro-:nano-particle ratios tested in Example 1.
Figure 9A:
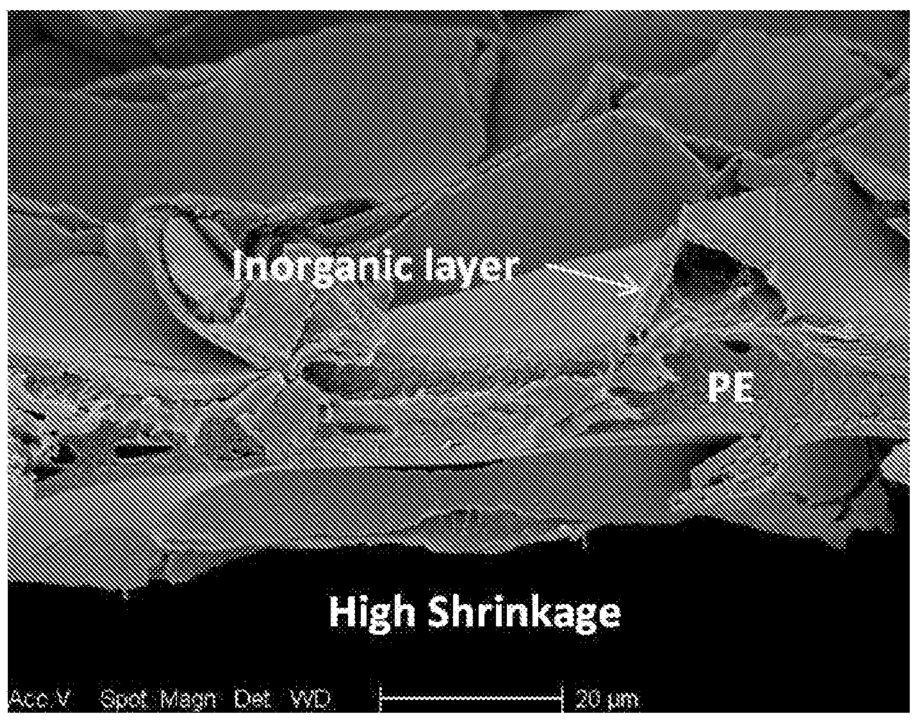
FIG. 9A depicts an SEM image of an inorganic coated PE-based separator exposed to 180° C. temperatures with high shrinkage.
Figure 9B:
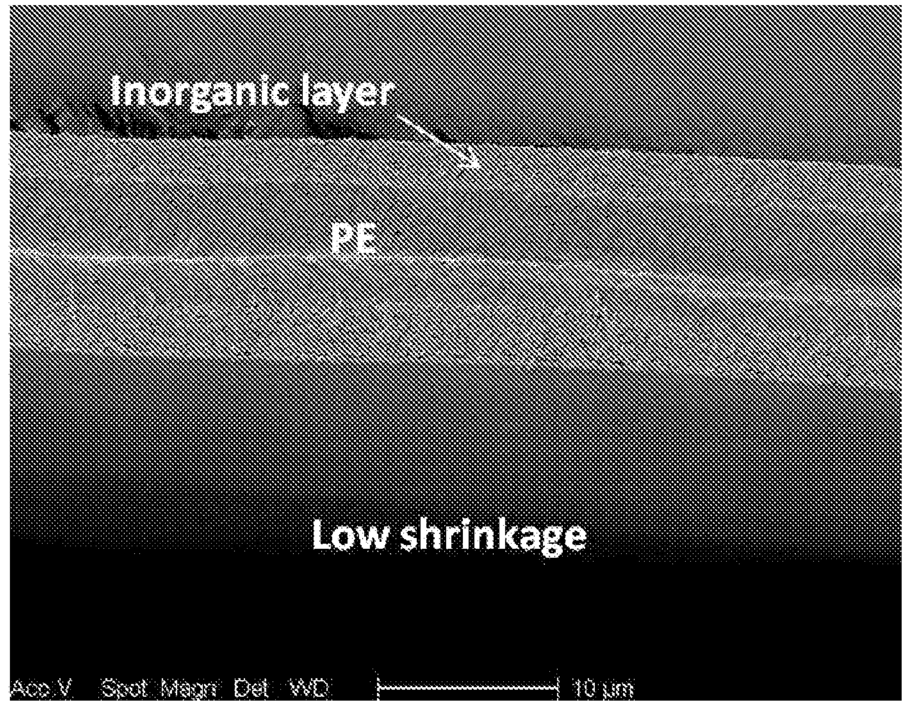
FIG. 9B depicts an SEM image of an inorganic coated PE-based separator exposed to 180° C. temperatures with low shrinkage where the multi-layer structure is preserved and the inorganic material porous layer maintained adhesion to the PE during shutdown.

Mercury porosimetry differential intrusion of the various inorganic coated separators made using the process disclosed in Example 1. The experiments show the effect of micro-:nano-particle ratios on pore size distribution for the coating. The pore size distributions for the different ratios tested are depicted in FIG. 8.

It will be apparent to those having skill in the art that many changes may be made to the details of the above-described embodiments without departing from the underlying principles of the invention. For example, an inorganic surface layer may be applied as a coating on a portion of the surface or the entire surface of a polyolefin membrane.

The invention claimed is:

1. A battery separator comprising:

a free-standing unitary multi-layer structure comprising a microporous polymer web characterized by a melting point and having two major surfaces and an inorganic material including nano-particles and micro-particles formed as a first porous layer on both of the major surfaces of the microporous polymer web, the nano-particles exhibiting a mean size less than or equal to 100 nm and the micro-particles exhibiting a mean size greater than 100 nm, the nano-particles forming 10% to 90% by weight of the inorganic material, the first porous layer comprising an organic hydrogen bonding component comprising one or more polyacrylic polymers, the inorganic material including sufficient nano-particles such that the first porous layer exhibits an average peel strength of at least 47 N/m, the first porous layer providing high-temperature dimensional stability and preserved multi-layer structure above the melting point of the microporous polymer web even as fluid permeability of the unitary multi-layer structure is decreased at elevated temperature.

2. The battery separator of claim 1, in which the inorganic material comprises an inorganic oxide, carbonate, hydroxide, or mixtures thereof.

3. The battery separator of claim 2, in which the inorganic material comprises alumina, silica, zirconia, titania, mica, boehmite, magnesium hydroxide, calcium carbonate, or mixtures thereof.

4. The battery separator of claim 1, wherein the first porous layer exhibits an average peel strength of 47 N/m to 200 N/m.

5. The battery separator of claim 1, in which the inorganic material exhibits a thermogravimetric weight loss of 1120 ppm to 2010 ppm over a 60° C. to 120° C. differential.

6. The battery separator of claim 1, in which the structure further comprises a second porous layer comprising a gel-forming polymer material with passageways.

7. The battery separator of claim 6, in which the gel-forming polymer material comprises polyvinylidene fluoride, poly(vinylidene fluoride-hexafluoropropylene) copolymers, poly(vinylidene fluoride-acrylic acid) copolymers, polyvinylpyrrolidone, polyacrylamide, or mixtures thereof.

8. The battery separator of claim 1, in which the microporous polymer web comprises a polyolefin.

9. The battery separator of claim 8, in which the polyolefin comprises polyethylene, polypropylene, or mixtures thereof.

10. The battery separator of claim 9, in which the polyolefin comprises ultrahigh molecular weight polyethylene (UHMWPE).

11. The battery separator of claim 1, in which the first porous layer has a median pore size of 15 nm to 100 nm.

12. The battery separator of claim 1, in which the micro-particles of the first porous layer comprises platelet-like particles.

13. The battery separator of claim 1, in which the first porous layer comprises less than 10% by weight of the organic hydrogen bonding component.

14. The battery separator of claim 13, in which the first porous layer comprises less than 10% by weight of the one or more polyacrylic polymers.

15. The battery separator of claim 1, in which the first porous layer exhibits an average peel strength of 47 N/m to 84 N/m.

16. The battery separator of claim 1, wherein the first porous layer consists essentially only of the nano-particles, the micro-particles, and a hydrogen bonding component forming 1% to 6%, by weight, of the first porous layer.

* * * * *